United States Patent [19]

Wilhelmsson et al.

[11] 4,409,903

[45] Oct. 18, 1983

[54] TRANSPORTATION APPARATUS

[76] Inventors: Tore C. Wilhelmsson, H>Kansdal 10, S-417 44 Göteborg; Sten M. Lundström, Centigatan 12, 50247 Boras, both of Sweden

[21] Appl. No.: 377,701

[22] Filed: May 12, 1982

Related U.S. Application Data

[63] Continuation of Ser. No. 954,127, Oct. 24, 1978, abandoned.

[51] Int. Cl.³ .............................................. B60P 1/00
[52] U.S. Cl. .................................... 104/162; 414/499; 414/522; 414/679; 414/525 R
[58] Field of Search ............... 414/522, 525, 629, 499; 254/35-38; 104/167, 176, 162

[56] References Cited

U.S. PATENT DOCUMENTS

| | | | |
|---|---|---|---|
| 2,606,504 | 8/1952 | Stamler | 104/162 |
| 2,784,852 | 3/1957 | Strauss et al. | 104/162 X |
| 2,900,922 | 8/1959 | Edmonds | 104/162 |
| 3,006,487 | 10/1961 | Gelli | 414/522 |
| 3,272,546 | 9/1966 | Cooley | 414/499 X |
| 4,033,620 | 7/1977 | Blake et al. | 414/679 X |

Primary Examiner—Johnny D. Cherry
Assistant Examiner—L. E. Williams

[57] ABSTRACT

Transportation apparatus comprising a vehicle, a track supported on the vehicle, a travelling device movable on the track, a plurality of pivotally movable piston-cylinder units driven by a pressure medium interspaced along the track in the longitudinal direction, one end of each of the piston-cylinder units is supported on the vehicle and the other end of each of the units is engageable with an engagement part connected to the travelling device. Cam rails extend along the track and cooperate with portions at the other end of the piston-cylinder units to cause alternating coupling operations of the other end of the piston-cylinder units with the travelling device.

3 Claims, 14 Drawing Figures

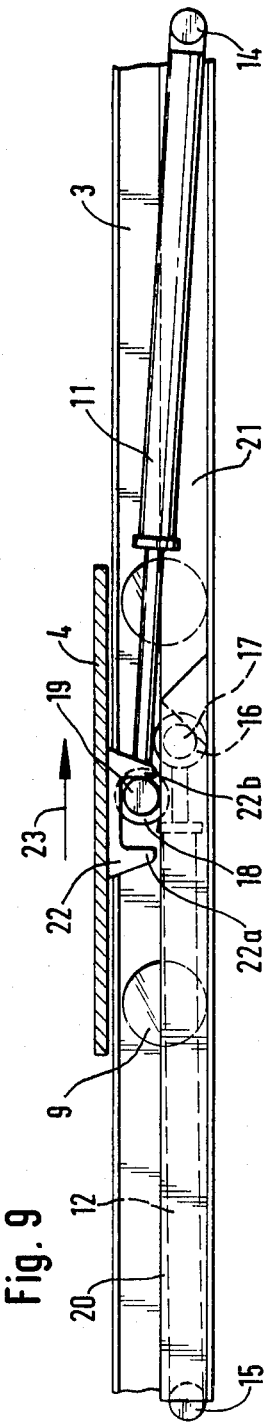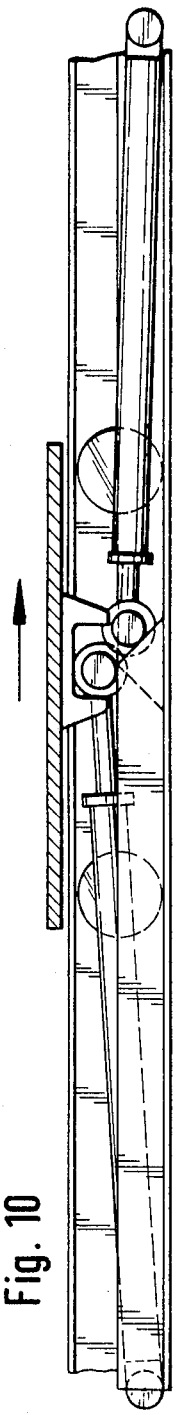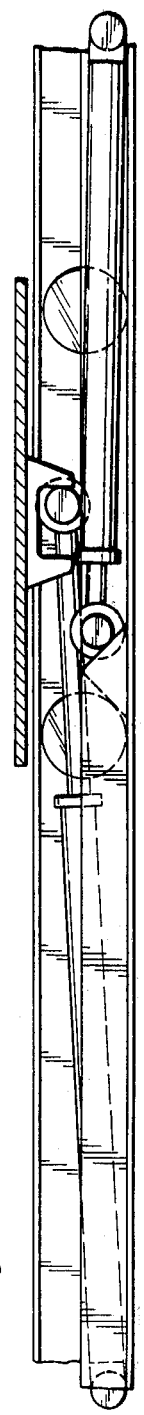

TRANSPORTATION APPARATUS

This is a continuation, of application Ser. No. 954,127, filed Oct. 24, 1978 now abandoned.

The present invention relates to a transportation apparatus comprising a track and a travelling device movable on the same.

It is a principal object of the invention to provide an apparatus of the above mentioned kind, in which the displacement of the travelling device is brought about by simple and comparatively inexpensive means.

This object is reached by means of a transportation apparatus according to the invention, which is substantially characterized by comprising a number of piston-cylinder units driven by a pressure medium and interspaced along the track in the longitudinal direction of which they are extending, one end of each one of said piston-cylinder units being supported by a stationary means of attachment and its other end permitting a detachable coupling with the travelling device, and means permitting alternating coupling operations of said other end of the piston-cylinder units with the travelling device.

Figure 1:
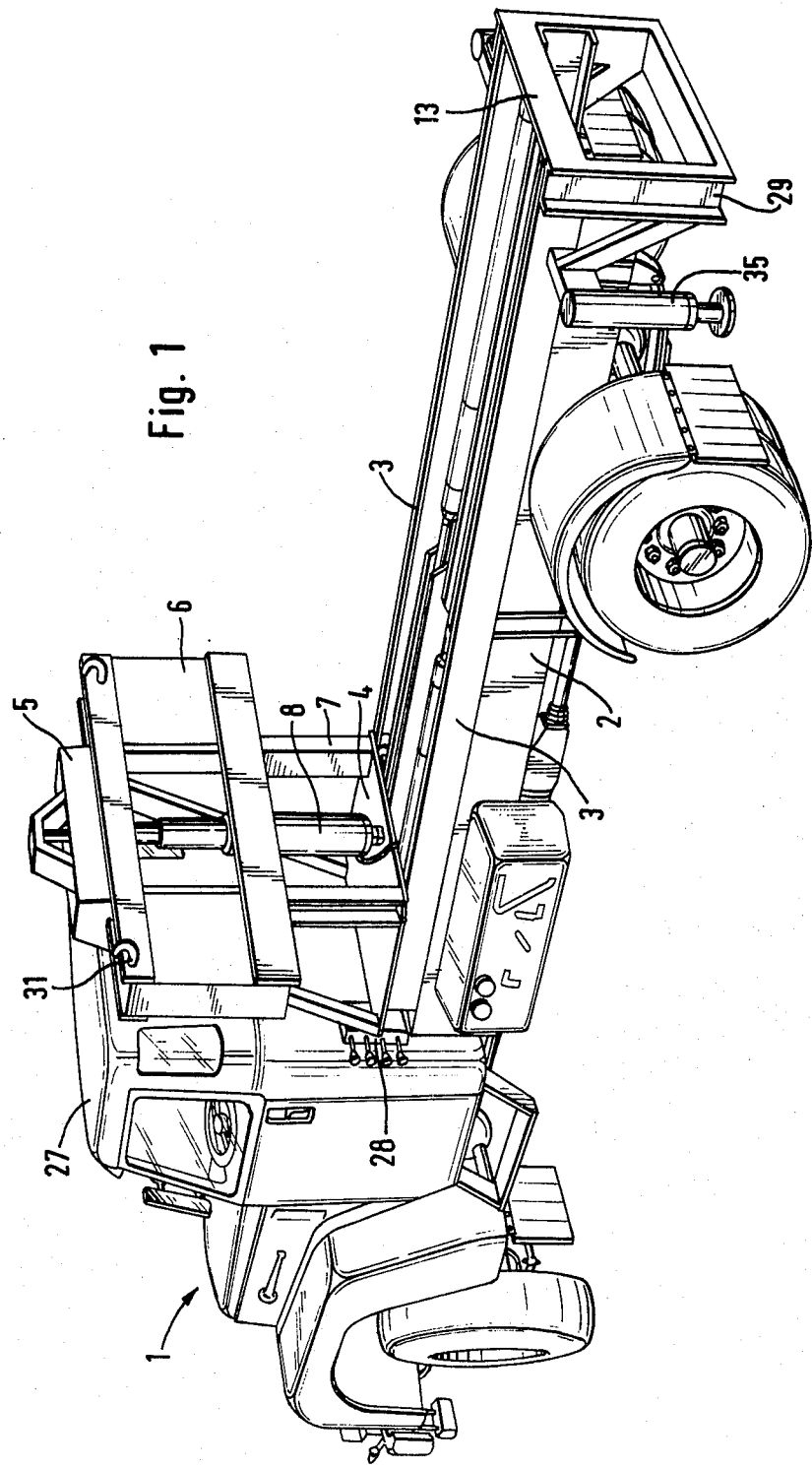
Figures 2, 3:
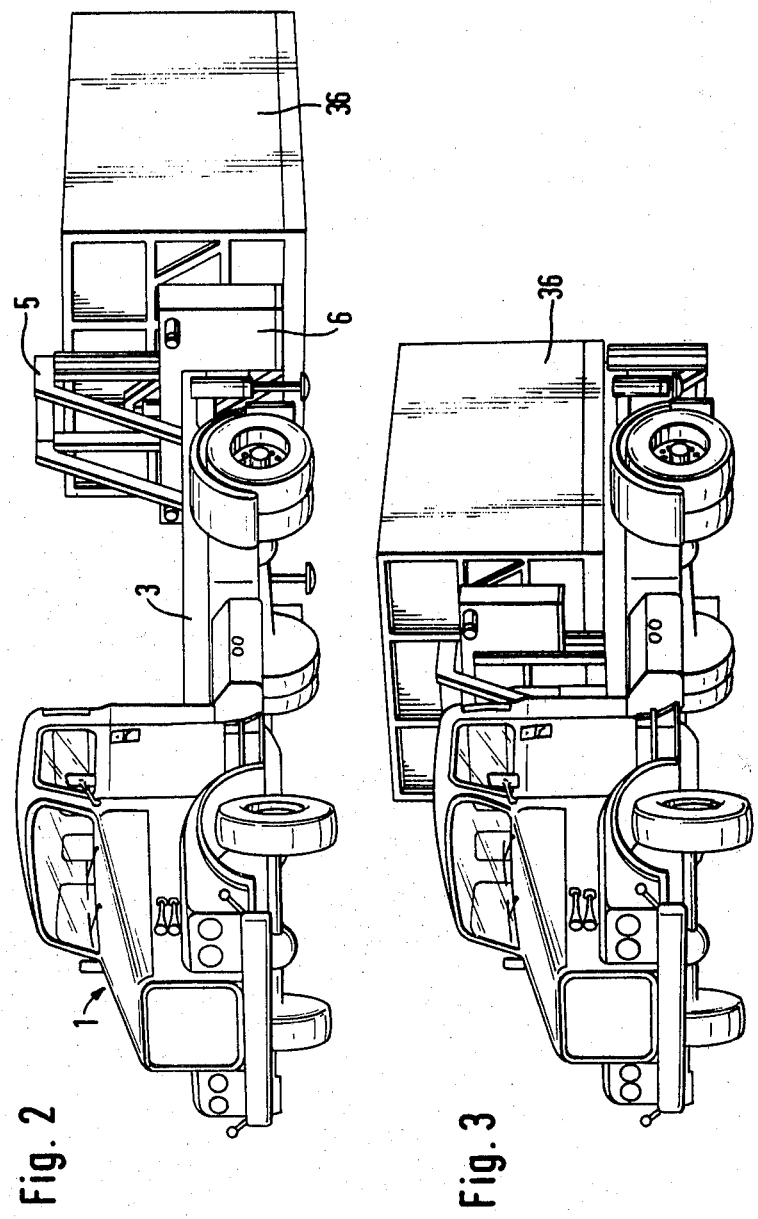
Figure 4:
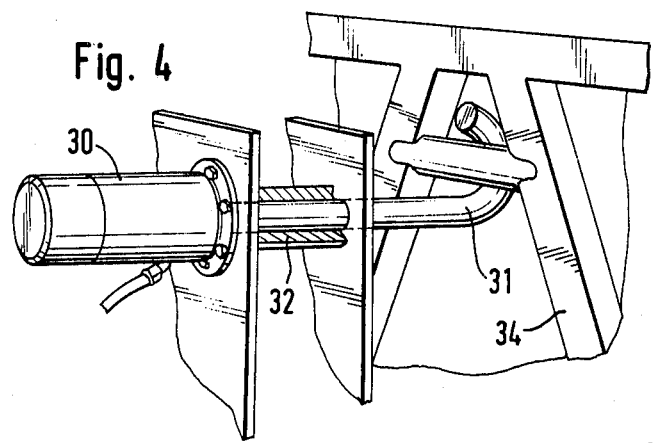
Figure 5:
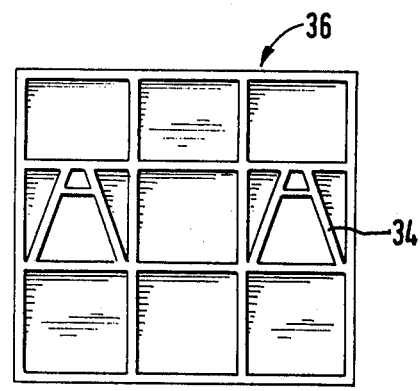
Figure 6:
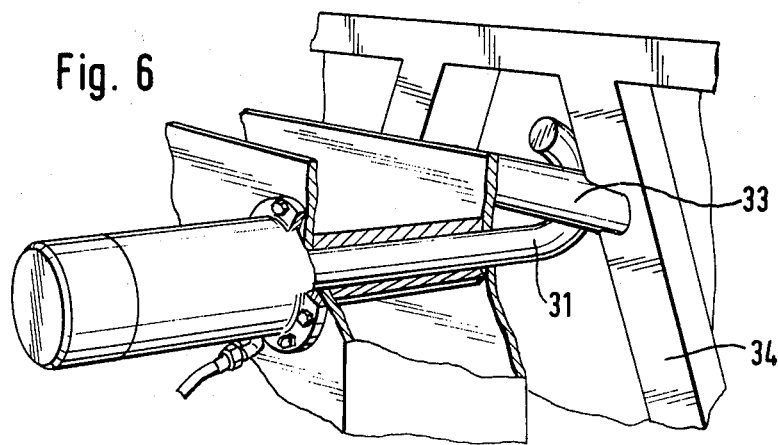
Figure 7:
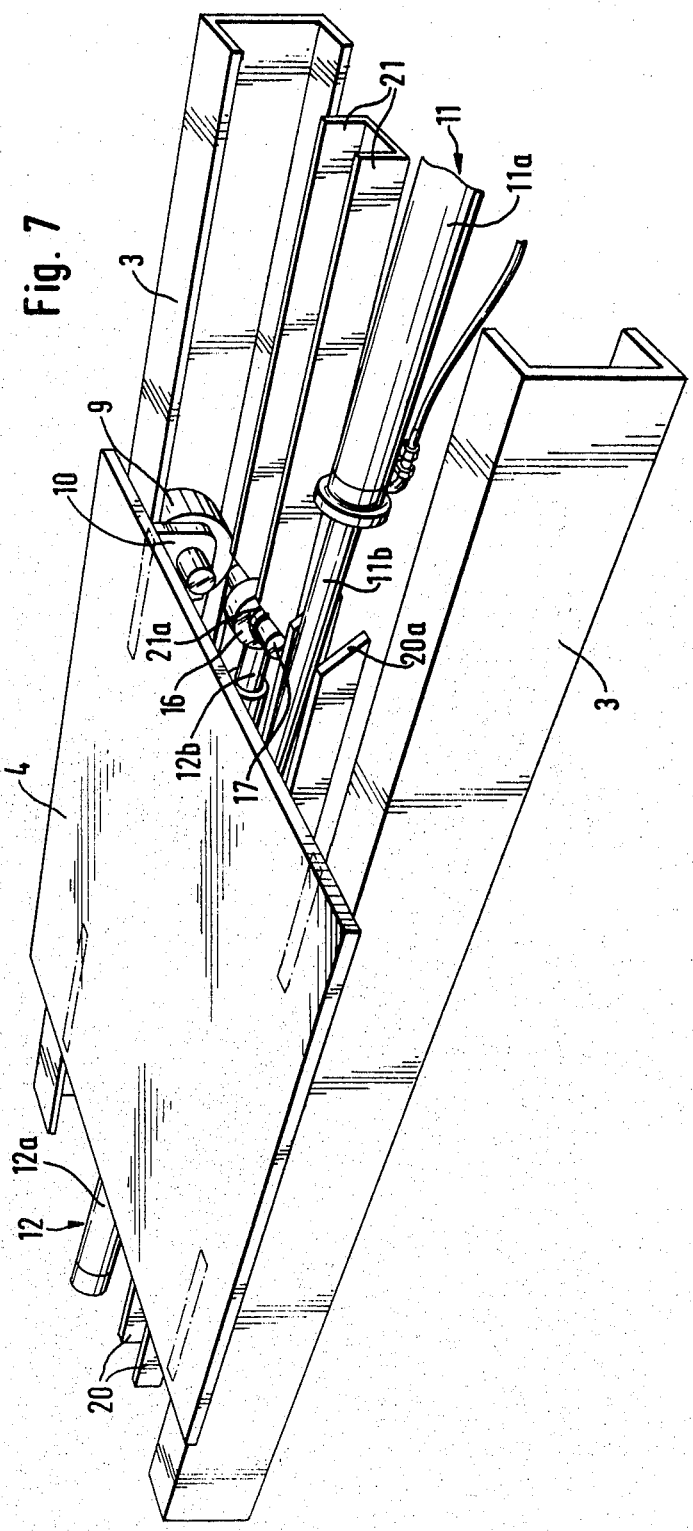
Figure 8:
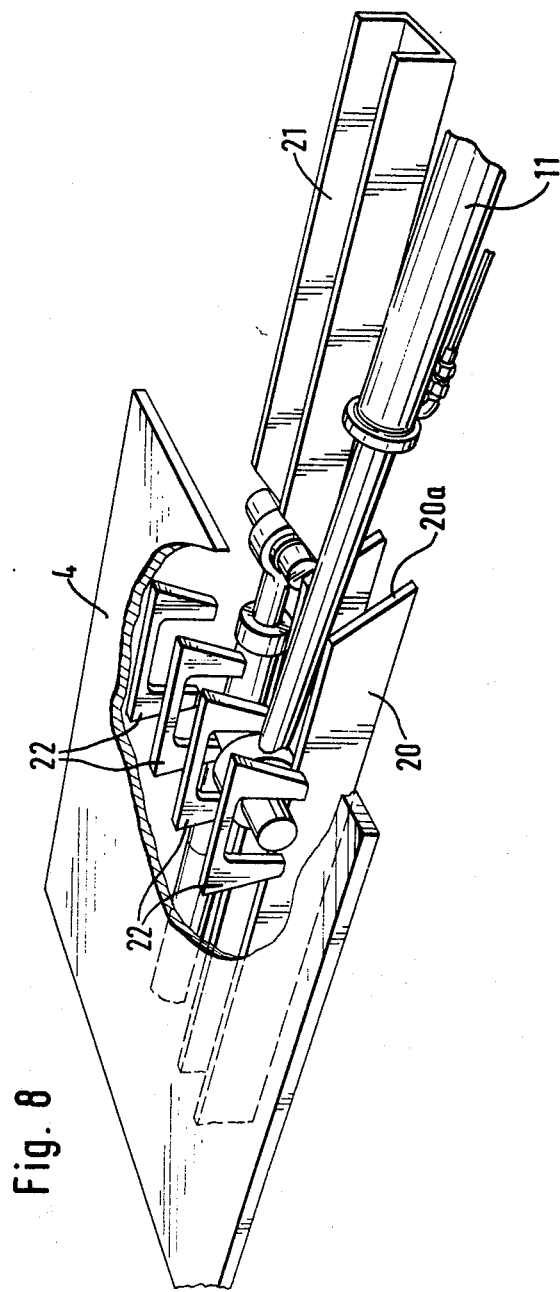
Figure 12:
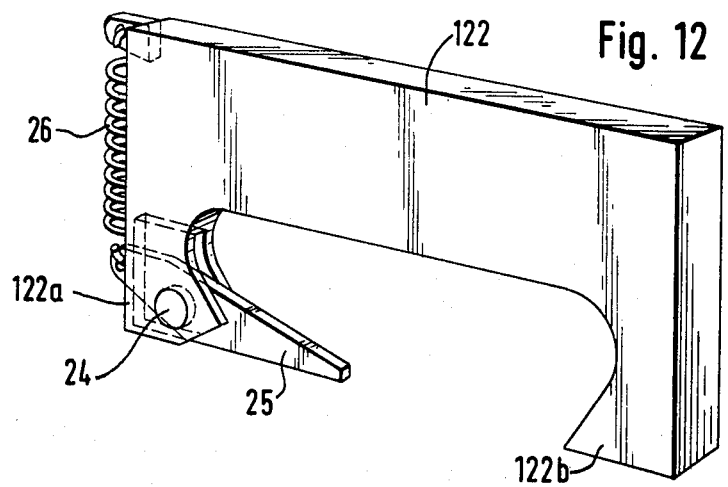
Figure 13:
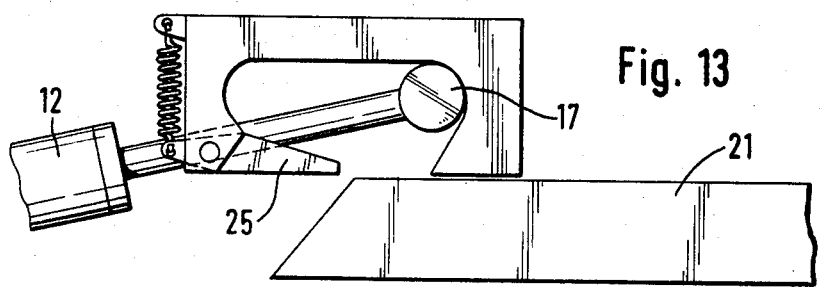
Figure 14:
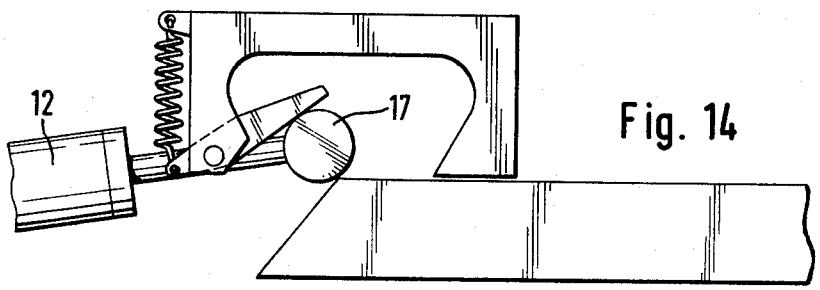

An example of embodiment of the invention is described in the following, reference being made to the accompanying drawings, in which FIG. 1 is a perspective view of a truck for container transportation and provided with the transportation apparatus according to the invention, FIG. 2 shows the same vehicle while being loaded with a container, which shall be transported by means of the same, FIG. 3 is a view corresponding to the one of FIG. 2 and showing the same vehicle, when the container intended for transportation has been lifted up on the vehicle, FIG. 4 is a detailed view of the container and the means for its being lifted up on the vehicle and being held in place on the same during the transportation, FIG. 5 is a rear end view of the front end of the container, FIG. 6 is a detailed view corresponding to the one of FIG. 4, but on a somewhat larger scale, FIG. 7 is a top view of the means designed according to the invention for a longitudinal transportation of the load, which is going to be transported by the vehicle, FIG. 8 is a view corresponding to the one of FIG. 7 partly in X-ray perspective, FIG. 9 is a schematic side elevational view of the longitudinal transportation means shown in the FIGS. 7 and 8 and being in its position of transportation, FIG. 10 is a corresponding view of the longitudinal transportation means in a different position, FIG. 11 shows the same transportation means in a third position, FIG. 12 shows a detail according to an alternative embodiment and forming part of the transportation means according to the invention, FIG. 13 schematically shows the detail illustrated in FIG. 12 in its connection with the transportation means in a first working position, and FIG. 14 shows the same detail in a second working position.

The transportation means designed according to the invention is in the drawings illustrated when being applied in connection with a vehicle for container transportation. However, it should be understood that the transportation means specified in the claims can be used also in other connections. In the FIGS. 1-3 a container transporting vehicle as a whole unit is indicated with 1, and on the longitudinally extending frame side members 2 of said vehicle two additional parallel carrying members 3 have been laid, which form a track for a travelling device 4 displaceable on the same. In the example of the embodiment shown the travelling device 4 supports an upright structure 5, which in its turn supports a vertically displaceable elevating lifting device 6, which is displaceably guided by two guide rails 7 located at a certain distance from each other in the crosswise direction of the vehicle. The lifting movement of the lifting unit is arranged by means of a jack 8 comprising a piston-cylinder unit of the telescopic kind. The lifting unit and its components will be described more in detail below. As is most evident from FIG. 7 the carrying members 3 comprise two channel-shaped members, the flanges of which point in direction toward each other. The inner surfaces of the flanges of the channels form a guiding means for a number of runners 9, which rotatably are supported by brackets 10 provided on the underside of the travelling device 4. Thus, the channels 3 in connection with the runners 9, the diameter of which substantially corresponds to the distance between the channel flanges, form an efficient guiding means for the travelling device in lateral as well as vertical direction. A rear piston-cylinder unit is indicated with 11 and a corresponding front piston-cylinder unit is indicated with 12. The cylinder housing 11a of the rear piston-cylinder unit is pivoted at a rear crossbeam 13 of the frame, of which the carrying members 3 form part. The rear pivoting support is indicated with 14 and forms an articulation extending in the crosswise direction of the chassis of the vehicle, so that the front end of the piston-cylinder unit can be vertically pivoted. The piston rod of the rear piston-cylinder unit is indicated with 11b. The front piston-cylinder unit is in a corresponding manner pivoted on the frame by means of a support 15. The cylinder housing of the front piston-cylinder unit is indicated with 12a and its piston rod is indicated with 12b. The piston rod 12b at its free rear end has a thicker portion 16, which in the crosswise direction is traversed by a shaft 17. The rear piston rod 11b at its front end has a corresponding thicker portion 18, which in its turn also is traversed by a crosswise directed axle shaft 19. A cam rail 20 is provided on both sides of the thicker portion 18 of the rear piston rod, and a corresponding cam rail 21 is provided on both sides of the thicker portion 16 of the front piston rod. The cam rails 20 at the front terminate at their rear in an inclined terminal edge 20a. The cross pins 17 and 19 on the respective piston-cylinder units are so long that they extend in the longitudinal direction for a distance outside of the respective cam rails. The rear terminal edge 21a have such a location that the shaft 17 is permitted to fall down in front of them, when the piston rod 12b is retracted, i.e. when it is in its extended position. A substantially U-shaped projection 22 projects from the travelling device 4 in downwards direction on each side of the respective cam rail 20, 21, the legs 22a and 22b respectively of said projection 22 extending to the immediate proximity of the upper edge of the cam rails or right below the same and together with the cross pins of the piston rods form cooperating driving stops.

In FIG. 9 the travelling device 4 is moving in backwards direction, i.e. in the direction indicated with the arrow 23. In the position illustrated in FIG. 9 the cross pin 19 of the piston rod 11b is positioned above the cam rails 20 and engages the carrier projections 22 of the travelling device, while the crosspins 17 of the front piston rod 12b is in a lowered down rest position. The supply of pressure medium to the two piston-cylinder units 11 and 12 is adjusted in such a manner that the movement of the piston-cylinder unit 11 in this position ceases, while the piston-cylinder unit 12 starts its extending movement in connection with which its cross pin 17 slides upwards on the terminal edges 21a of the cam rails 21 and consequently engages the carrier projections 22 of the underside of the travelling device, thus bringing the same to continue its movement in the direction of the arrow 23, as is shown in FIG. 11, while the cross pin 17 slides against the top sides of the cam rails 21. The return movement of the travelling device is brought about in the reverse manner. In the example of embodiment shown the different piston-cylinder units are directed against each other and two in number. It is of course within the scope of the invention to provide a series comprising a greater number of piston-cylinder units along a displacement track. It is possible in such a case to place the piston-cylinder units in pairwise arrangement one pointing toward the other as in the illustrated example, but it is of course also possible to arrange all of the piston-cylinder units pointing in the same direction and interspaced along the track of displacement according to the length of the actual piston cylinder unit. In order to provide an additional safety measure impeding the cross pins of the piston-cylinder units to jump out of their engagement with the carrier projections, while the travelling device is performing its movement of displacement, the carrier projections can suitably be given the alternative design shown in the FIGS. 12-14. In these figures only one carrier projection is shown, and this projection is indicated with 122, its two legs being indicated with 122a and 122b respectively. The leg 122a has a pawl 25 pivoted round a pin 24 and is by means of a tension spring 26 loaded towards the position shown in FIG. 12. FIG. 13 approximately corresponds to the position of the cross pins 17 of the piston rod shown in FIG. 11, while FIG. 14 corresponds to the earlier position, in which the cross pin 17 slides upwards on the terminal surfaces 21a of the cam rails 21. In this movement the pawl 25 is pivoted upwards, so that the cross pin 17 is permitted to introduce itself in the space between the two legs 122a and 122b of the carrier projection. When the cross pin has passed the pawl 25, it again pivots back to the position shown in FIG. 13. During the return movement of the travelling device it is thereby prevented that the cross pins will prematurely fall out from the carrier projection.

In the FIGS. 1-3 the above described means of transportation is shown in an application on a truck. It is of course possible to use this transportation means in many other connections without therefore departing from the fundamental idea of the invention. In the embodiment shown the movement of the travelling device, i.e. the work of the piston-cylinder unit is controlled by means of an operating bar 28 located behind the driver's cabin 27. The frame formed by the carrier members 3 and the cross beam 13 is attached to the chassis of the vehicle in a demountable manner. The guiding rails 7 forming part of the upright structure 5 comprise laterally open channel profiles, in which a number of runner wheels are running. Corresponding channel rails 29 are provided at the rear of the frame 3, 13. These rails form an extension of the guide rails 7, when the upright structure 5 is in the rear position of its displacement shown in FIG. 2. In this position the lifting unit can move as far as almost down to the ground level in order to take up a container 36. A piston-cylinder unit 30 is provided in each one of the outer corners of the lifting unit 6, the piston rod 31 of said unit 30 in a bushing 32 being displaceably supported in the lifting unit. The free end of the piston rod 31 is bent in upwards direction in order to cooperate with a cross pin 33 provided at the front end of the container. Thus, when a container is going to be taken up, the lifting unit 6 is lowered down into the position shown in FIG. 2, in which the truck is backed towards the front end of the container, the lifting unit being lowered so far that the piston rods have a clear passage below the cross pins 33. In the extended position of the piston rods 31 the lifting unit 6 is raised to the position, in which the bent end portions of the piston rods project past the cross pins 33. In order to facilitate the guiding in inwards direction, the cross pins 33 are supported by upwards converging stiffening stays 34 on the container. In the position now reached the piston rods 31 are retracted, which means that the front end of the container is pressed against the lifting unit 6 and can be lifted further by a continued movement in upwards direction of the lifting unit. When the container has been lifted to the level of the loading platform, the movement of displacement of the travelling device is started in forwad direction to the position shown in FIG. 3. In order to prevent the vehicle from tilting, it is at the rear provided with a supporting leg 35 on each side. The different power units, i.e. the cylinders of the supporting legs 35, the power cylinders for the displacement of the travelling device 4, the power cylinder 8 for the movement of the lifting unit 6, and the coupling units 30 are operated each one with its operating bar 28.

The invention is not limited to the means described above by way of examle only, but can be varied as to its details within the scope of the following claims without therefore departing from the fundamental idea of the invention.

We claim:

1. Transportation apparatus comprising a vehicle, a track supported on said vehicle, a traveling device movable on said track, a plurality of pivotally movable piston-cylinder units driven by a pressure medium and interspaced along the track in a longitudinal direction in which they extend, a stationary means of attachment on said vehicle for pivotally supporting one end of each of said piston-cylinder units, an engagement part connected to said traveling device having projections, the other end of each of said piston-cylinder units having engagement means engageable with said engagement part, and cam rails extending along said track cooperable with said engagement means, said engagement means of the piston-cylinder units sliding along said cam rails, which depending upon the degree of extension of the piston-cylinder units, cause cross-wise displacement of the other end of said piston-cylinder units in a direction towards and away from said engagement part of the traveling device for alternate coupling operations of said other end of the piston cylinder units with the traveling device, the height of the cam rails determining the cross-wise position of said engagement means, whereby at least one of the piston-cylinder units always is in engagement with the traveling device.

2. Transportation apparatus according to claim 1, wherein said engagement means of the piston-cylinder units comprise cross-wise extending engagement pins, said cam rails being arranged in pairs with the cam rails of each pair supporting one of the engagement pins.

3. Transportation apparatus according to any one of claims 1 or 2, wherein said piston-cylinder units are pair-wise directed one against the other with the stationary means of attachment thereof being located at ends of the piston-cylinder units facing away from each other.

* * * * *